United States Patent [19]
Hartrumpf

[11] Patent Number: 5,315,371
[45] Date of Patent: May 24, 1994

[54] DEVICE FOR MEASURING THE POSITION OF A FILAMENT BUNDLE

[75] Inventor: Matthias Hartrumpf, Karlsruhe, Fed. Rep. of Germany

[73] Assignee: Fraunhofer Gesellschaft zur Forderung der angewandten Forschung e.V., Fed. Rep. of Germany

[21] Appl. No.: 970,469

[22] Filed: Nov. 2, 1992

Related U.S. Application Data

[63] Continuation of Ser. No. 648,852, Jan. 31, 1991, abandoned.

[30] Foreign Application Priority Data

Jan. 31, 1990 [DE] Fed. Rep. of Germany ....... 4002743

[51] Int. Cl.$^5$ ................................................. G01B 9/02
[52] U.S. Cl. ............................... 356/355; 356/384; 356/385
[58] Field of Search ............... 356/356, 429, 430, 431, 356/238, 355, 353, 354, 73.1, 384, 385

[56] References Cited

U.S. PATENT DOCUMENTS

| | | | |
|---|---|---|---|
| 3,659,950 | 5/1972 | Troll et al. | 356/238 |
| 3,812,376 | 5/1974 | Takeyama et al. | 250/572 |
| 4,650,322 | 3/1987 | Fejer et al. | 356/385 |
| 4,801,207 | 1/1989 | Williams | 356/385 |
| 4,998,823 | 3/1991 | Kitajima | 356/356 |

FOREIGN PATENT DOCUMENTS

| | | |
|---|---|---|
| 2847552 | 5/1980 | Fed. Rep. of Germany . |
| 57-206806 | 3/1983 | Japan . |
| 2221296 | 7/1988 | United Kingdom . |

OTHER PUBLICATIONS

Melliand Textilberichte Jul. 1987.

*Primary Examiner*—Samuel A. Turner
*Attorney, Agent, or Firm*—Eveson, McKeown, Edwards & Lenahan

[57] ABSTRACT

A device for measuring the position of a filament bundle as it is withdrawn vertically from a spinnerette, and blown against for cooling, comprising a source of light disposed adjacent the filament bundle in a plane approximately normal to the withdrawing direction, light detector means disposed at an angle α relative to the source of light, wherein the angle is sufficiently wide that light from the source of light will not impinge directly on the detector means, and analyzer means to calculate the position of the filament bundle on the basis of the signal issuing from the detector means.

19 Claims, 1 Drawing Sheet

DEVICE FOR MEASURING THE POSITION OF A FILAMENT BUNDLE

This is a continuation of application Ser. No. 07/648,852, filed Jan. 31, 1991, now abandoned.

BACKGROUND AND SPECIFICATION OF THE INVENTION

The present invention relates to a device for measuring the position of a filament bundle in a spinning device for synthetic fibers.

In spinning frames for spinning synthetic fibers, the hot thread filaments leave the spinnerette in a bundle, and along a distance of roughly 2 to 6 meters a cooling means blows against the filaments. The filaments are withdrawn by a withdrawing means, are then twisted and wound onto a reel. The threads move at a rate of several m/sec. Since a stationary spinning condition should be achieved, an effort is made whenever possible, to measure the position and the variation of the center of gravity of the filament bundle at the location of the widest deflection of the bundle from the vertical. Heretofore, this has so far been done by the operators watching the process.

On pages 463 to 365 of the trade journal *Melliand Textilberichte* No. 7/1987, a system is disclosed which measures textile cloth by means of an optical system in order to detect the flaws and faults in the cloth. The system is not suitable, however, to measure the positions of filaments or of a filament bundle, since all of the light passing through the textile spot arrives in an integrating ball so as to be measured.

U.S. Pat. No. 3,659,950 discloses a system for measuring the position of a thread in which the light emitted by a laser is passed via deflector mirrors and directed onto the thread, whereupon it is received by a detector array system disposed directly in the optical path, before the image is analyzed. This system is also not unsuitable to measure the position of a bundle of filaments.

It is therefore the object of the present invention to provide a device which will permit the measurement of the position of a bundle of filaments so as to allow for the automatic detection of the position of the filament bundle.

This object is achieved according to the invention by arrangement of the detector means at an angle relative to the illumination, so that direct light from the source of light does not impinge on the detector means. The angle corresponds therefore to a value of 10° to 45° approximately. This angular disposition is required in particular since the intensity of the signal issuing from the individual fibers is less than 1 $\mu$Watt while the source of light may produce an output of some 150 watts, so that the ratio amounts to roughly $1:10^8$ to $1:1^9$. Observation on a dark ground is therefore required. The detector means may be a TV camera or a matrix of photodiodes, for instance, or even a position-sensitive photodiode (PSD). In any case, an optical system such as a convergent lens must be positioned ahead of these sensors.

The invention is the first to allow for imaging a section of the fiber bundle onto a sensor so as to provide for measurement of the positions of both the individual fibers or the center of gravity of the bundle. Since the fiber gauge is roughly 10 $\mu$m, there is no vignetting of individual filaments so that the individual positions or the center of gravity may actually be measured. The deflection from the vertical or the longitudinal axis of the thread amounts to several centimeters up to 20 cm, depending on the power of the blower and its distance from the spinnerette.

According to one embodiment of the invention, the light diffracted at the filaments is measured. The additional measurement of the intensity of the light impinging onto the sensor, allows for a measurement of the number of gauge or the filaments, respectively.

The angle enclosed between the illuminating means and the detector means moreover allows for the additional measurement of the position(s) in the illuminating direction, since variations in the position in the illuminating direction can be detected on the basis of the image in the form of variations of the height of the image on a two-dimensional sensor.

It is moreover expedient to operate the source of light in a pulsed mode or to pass the light intermittently through a suitable light valve. This is an advantageous provision since in such a case the light emitted from the environment may be filtered out, in a manner known per se, in an electronic unit.

When a CCD array is selected for the sensor, the width of the bundle may be calculated on the basis of the individual filament positions detected. When a PSD element is used, a further resolution of the individual positions is no longer possible. In such a case the width of the bundle may be measured then by means of a filter or, in an equivalent manner, by means of a modified illumination system. The principle of measurement is based on the measurement of the mean value of the position and on the additional measurement of a value such as the root mean square. This allows for the detection of the variance of the filament position in the blowing direction as the basis of calculation of the width of the bundle.

When the position of the filament bundle is measured by means of a two-dimensional analog position-sensitive sensor (PSD) in the x' direction, the mean value f(x') in the y' direction may be measured. The two measured mean values permit the derivation of the width of the bundle.

Furthermore, the positional variance is obtained from the mean values of $x'^2$ and $x'$, and thus the standard positional deflection of the image on the detector is determined as a basis for the calculation of the width of the bundle.

Instead of a single filter, it is possible to dispose, ahead of the sensor, a filter which consists of a plurality of polarizing filters. It is possible in this way to measure additionally the degree of polarization of the light diffracted at the filaments.

Other objects, advantages, and novel features of the present invention will become apparent from the following detailed description of the invention when considered in conjunction with the accompanying drawings.

DETAILED DESCRIPTION OF THE DRAWINGS

Figure 1:
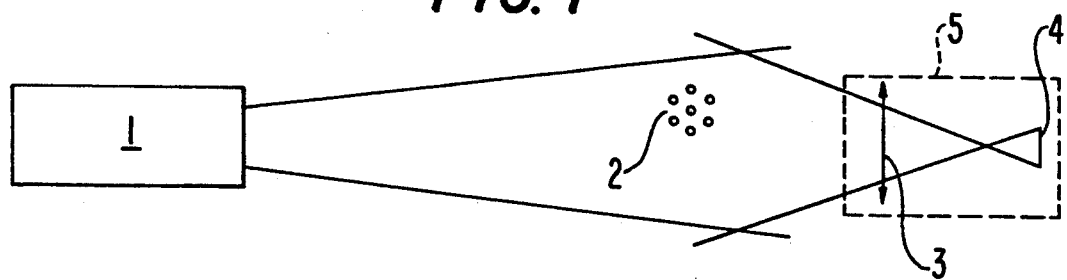
FIG. 1 illustrates a plan view of the inventive device.

Referring to FIG. 1, reference numeral 1 indicates the source of light which illuminates the bundle of fibers 2 intermittently. This bundle of fibers leaves a spinnerette at a high speed, then a cooling means, which is not illustrated, blows against the bundle, whereupon the bundle is withdrawn by a withdrawing means. Thereupon the bundle of fibers arrives in the spinning device where the individual fibers are spun. The withdrawing and the spinning means are also not illustrated. Opposite to the source of light is disposed a detector means 5, which consists of an optical system 3 for imaging the filament bundle 2 onto a sensor 4. The distance between the source of light and the sensor falls within the range of approximately 0.2 to 2 meters, while the filament bundle will be located in the center of this distance approximately. The detector means 5 is joined by an analyzer means to analyze the measured signals.

It is expedient to arrange the system in a way that the illuminating direction will be selected to be normal to the blowing and withdrawing means, while the measurement of the position is made in parallel to the blowing direction, which means that the coordinate direction of the sensor used for positional measurement extends in parallel to the blowing direction. In the following this coordinate direction will be referred to as $x'$.

As the intensity of the source of light 1 is substantially higher than the intensity of the signal issuing from the bundle of fibers, with the signal ratio corresponding to $10^8:1$ approximately, the detector means must be disposed outside the optical path of the source of light 1.

Figure 2:
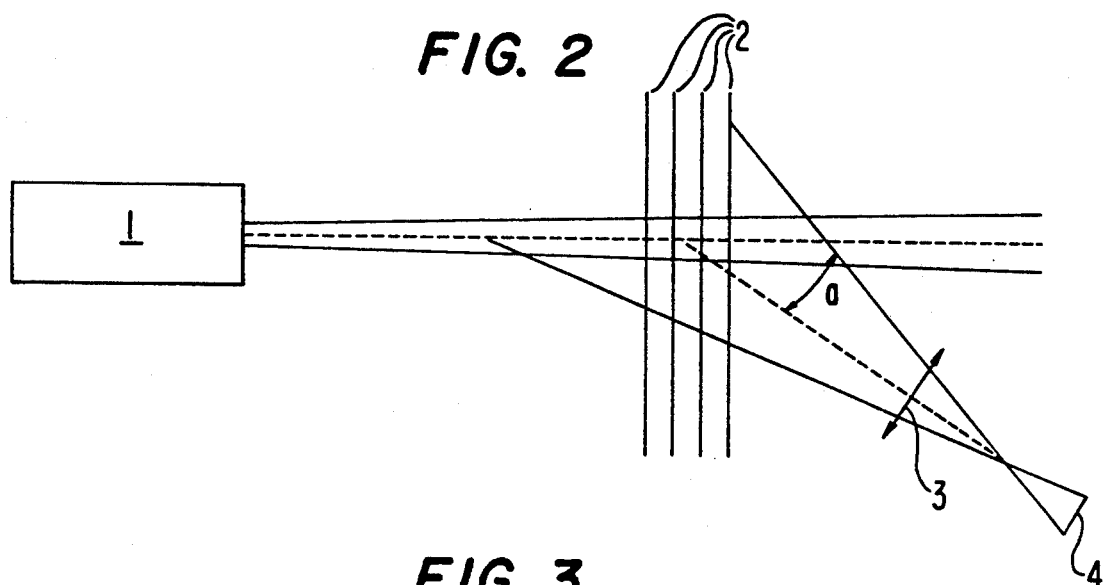
FIG. 2 is a side view thereof.
Figure 3:
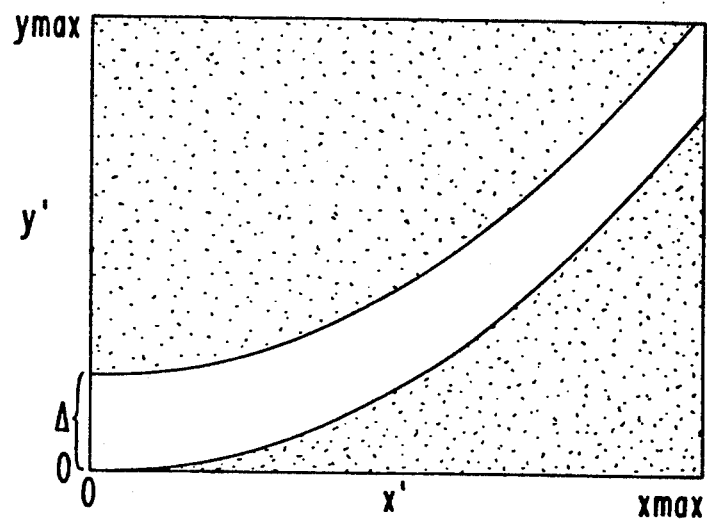
FIG. 3 shows a specifically designed filter.

FIG. 2 illustrates an expedient means wherein the detector means 5 is deviating from the horizontal by an angle $\alpha$ so that the light from the source 1 cannot impinge directly on to the detector means. With an appropriate equipped illuminating system and with the application of a two-dimensional sensor it will then be possible, too, to measure also the deflection of the bundle of filaments in the illuminating direction, as has been set out in the foregoing.

The width of the bundle can be determined by analyzing the recorded individual filament positions. A prerequisite for such an analysis is the use of a sensor providing for the measurement of the individual filament positions, such as a CCD line or CCD matrix type sensor.

With the application of a PSD element it is no longer possible to achieve a resolution of the individual filaments; in such a case the mean width of the bundle may be measured, for instance, by means of a filter presenting a parabolic aperture.

First of all the principle of measurement of the mean position of a filament bundle in the blowing direction by means of a PSD element will be explained. The coordinate direction of the PSD element used for mean position measurement extends in parallel to the blowing direction and is identified as $x'$.

A light spot or beam hitting the PSD element is generally known to produce two output currents per coordinate direction which are defined for the $x'$ coordinate by the relationships:

$$C_n = f*I + \frac{L-x'}{2*L} \text{ and } C_p = f*I + \frac{L+x}{2*L}$$

wherein I corresponds to the intensity of the light spot, $C_n$ or $C_p$, respectively, define the negative or positive side of the PSD element, $2*L$ indicates the length of the active PSD surface, $x'$ indicates the position of the light spot on that surface, and F is a constant factor.

The $x'$ position may be determined independently of the intensity:

$$x' = k * \frac{C_p - C_n}{C_p + C_n}$$

with k being a constant factor as well.

When more than one light spot hits the active surface, the corresponding currents are superimposed, while the PSD element measures the optical center of gravity of the light spots on the active surface.

$$x' = k * \frac{C_p - C_n}{C_p + C_n} \text{ or } x' = k * \frac{\sum_i I_i * X_i}{\sum_i I_i}$$

wherein index "i" defines the value of the i-th light spot.

It is possible in this manner to operate on one PSD to establish the center of gravity of an approximately radially symmetrical bundle consisting of identical filaments.

The measurement of bundles presenting a different geometry or consisting of different filaments presents only comparatively small measuring errors which may be minimized by balancing calculations.

As has been shown in the foregoing, one PSD element is appropriate to determine the mean position in the direction of light propagation by means of the systems according to FIGS. 1 and 2.

As an alternative, the width of the bundle may be measured by means of a filter or, in an equivalent approach, by means of a modification of the illumination system. In that arrangement the illuminating system is so modified that the imaged filament section exceeds the height of the PSD element. In that portion the filaments are only slightly curved so that the image is almost parallel to the $y'$ direction of the PSD element. If in that case a filter were used, which is transparent only within the range $\Delta$ about the straight line $y'=x'$, the mean position of the filament bundle were measured in both the $x'$ and the $y'$ direction. When a filter is used which has a transparent range defined by $y'=x'^2+\Delta$ the mean position is measured in the $x'$ direction (blowing direction) as before, while in the $y'$ direction the mean $$y' = k' * \frac{\sum_i y'_i}{\sum_i I_i}$$

is determined, wherein with $y'_i$ of the $y'$ position of the image of the i-th filament which is defined by $$y'_i = k'*x'^2_i, \text{ becomes } y' = k'*x'^2$$

With the normalization being carried out automatically by means of the PSD element, the aforementioned filter is appropriate for the additional measurement of the root mean squares of the filament positions, with application of the aforedefined premises. When the filament distribution in the bundle is known, it is then possible to derive therefrom the width of the bundle.

The uncomplex provisions may now be used to determine the optimum position or thread deflection during the spinning process with facilitated continuous monitoring of the spinning process.

The present invention may also be applied for monitoring purposes in the production of thin wires, e.g., those of copper or metal.

I claim:

1. Device for measuring position of a bundle of filaments as it is withdrawn in a first direction from a spinnerette of a spinning machine, comprising:

a source of light disposed adjacent to said filament bundle in an illumination plane which is approximately normal to said first direction, whereby light from said light source impinges on said filament bundle in said illumination plane;

a light measuring detector disposed adjacent said filament bundle at and angle relative to said illumination plane, said angle being chosen such that light from said source of light does not impinge directly on the detector, and analyzer means responsive to a signal from said light measuring detector for the calculating of the position of said filament bundle.

2. Device according to claim 1, wherein said light measuring detector comprises an optical system disposed adjacent at least one light sensitive sensor.

3. Device according to claim 1, wherein said light measuring detector is positioned so that light scattered by said filaments impinges thereon and is measured thereby.

4. Device according to claim 2, wherein said light measuring detector is positioned so that light scattered by said filaments impinges thereon and is measured thereby.

5. Device according to claim 1, wherein said source of light is adapted to emit light pulses.

6. Device according to claim 1, wherein said source of light incorporates a light valve whereby the output from said source of light is emitted in pulses.

7. Device according to claim 5, wherein said light pulses are generated by means of a light valve.

8. Device according to claim 1, wherein said source of light and said detector means are disposed approximately normal to said first direction in which said filament bundle is withdrawn.

9. Device according to claim 1, wherein said light measuring detector comprises at least one two-dimensional sensor.

10. Device according to claim 8, wherein said light measuring detector comprises at least one two-dimensional sensor.

11. Device according to claim 1, wherein a light filter is disposed adjacent said detector means.

12. Device according to claim 11, wherein said filter is a two-dimensional filter having coordinates $x'$, $y'$, and is transparent only within a range $y' = f(x') + \Delta(x')$, with $f(x')$ being a monotonic function of $x'$ and $\Delta(x')$ denoting half of said transparent range at the position $x'$.

13. Device according to claim 12, wherein $f(x') = x'^2$.

14. Device according to claim 1, wherein said source of light emits a luminous beam having a height, parallel to the vertical direction, and a width, said height varying monotonically with said width, approximately normal to the first direction.

15. Device according to claim 11, wherein said filter comprises a plurality of polarizing filters whereby the degree of polarization of the light detected at said filaments can be measured.

16. Device according to claim 3, wherein said light measuring detector measures intensity of light scattered at the filaments whereby the number or gauge of said filaments can be detected.

17. Device according to claim 4, wherein said light measuring detector measures intensity of light scattered at the filaments whereby the number or gauge of said filaments can be detected.

18. Device according to claim 1, wherein of optical path between said source of light and said detector means is folded by mirrors.

19. Device according to claim 15, wherein of optical path between said source of light and said detector means is folded by mirrors.

* * * * *